(12) United States Patent
Fattori (10) Patent No.: US 7,204,898 B2
(45) Date of Patent: Apr. 17, 2007

(54) THERMOPLASTIC FENCING CONSTRUCTION AND METHOD OF ASSEMBLY THEREOF

(75) Inventor: James Fattori, Trevose, PA (US)

(73) Assignee: LMT Mercer Group Inc., Lawrenceville, NJ (US)

( * ) Notice: Subject to any disclaimer, the term of this patent is extended or adjusted under 35 U.S.C. 154(b) by 268 days.

(21) Appl. No.: 10/898,052

(22) Filed: Jul. 23, 2004

(65) Prior Publication Data

US 2006/0033090 A1 Feb. 16, 2006

(51) Int. Cl.
*B32B 37/00* (2006.01)
(52) U.S. Cl. .................. 156/73.1; 156/293; 156/308.2
(58) Field of Classification Search ............... 156/73.1, 156/293, 298, 308.2, 580.1, 580.2; 264/442, 264/443, 445
See application file for complete search history.

(56) References Cited

U.S. PATENT DOCUMENTS

| | | |
|---|---|---|
| 4,301,343 A | 11/1981 | Jonelis |
| 4,544,425 A | 10/1985 | Provolo |
| 4,569,438 A | 2/1986 | Sheffler |
| 4,618,516 A | 10/1986 | Sager |
| 4,631,685 A | 12/1986 | Peter |
| 4,769,095 A | 9/1988 | Sager |
| 5,011,555 A | 4/1991 | Sager |
| 5,199,837 A | 4/1993 | Goss |
| 5,238,717 A | 8/1993 | Boylan |
| 5,303,900 A | 4/1994 | Zulick, III et al. |
| 5,360,499 A | 11/1994 | Savovic et al. |
| 5,401,342 A | 3/1995 | Vincent et al. |
| 5,411,616 A | 5/1995 | Desai et al. |
| 5,421,556 A * | 6/1995 | Dodge et al. .................. 256/1 |
| 5,520,775 A | 5/1996 | Fischl et al. |
| 5,540,808 A | 7/1996 | Vincent et al. |
| 5,782,575 A | 7/1998 | Vincent et al. |
| 5,830,300 A | 11/1998 | Suzuki et al. |
| 5,853,167 A * | 12/1998 | West et al. .................. 256/66 |
| 5,855,706 A | 1/1999 | Grewell |
| 5,899,239 A | 5/1999 | Coulis |
| 5,924,584 A | 7/1999 | Hellstrom et al. |
| 5,931,450 A * | 8/1999 | Yoder .......................... 256/66 |
| 6,001,201 A | 12/1999 | Vincent et al. |
| 6,032,694 A * | 3/2000 | Wellen et al. ................ 138/89 |
| 6,032,695 A * | 3/2000 | Wellen et al. ................ 138/89 |
| 6,066,216 A | 5/2000 | Ruppel, Jr. |
| 6,068,901 A | 5/2000 | Medal |
| 6,176,953 B1 | 1/2001 | Landreth et al. |
| 6,220,777 B1 | 4/2001 | Clarke et al. |
| 6,228,508 B1 | 5/2001 | Kassanits et al. |
| 6,290,551 B1 | 9/2001 | Nguyen |
| 6,447,866 B1 | 9/2002 | Kagan et al. |
| 6,461,763 B1 | 10/2002 | Witzigreuter et al. |
| 6,461,765 B1 | 10/2002 | Witzigreuter |
| 6,804,921 B2 * | 10/2004 | Neylon ........................ 52/244 |

* cited by examiner

*Primary Examiner*—James Sells
(74) *Attorney, Agent, or Firm*—Sperry, Zoda & Kane (57) ABSTRACT

A fencing construction made of thermoplastic materials which can be easily assembled utilizing ultrasonic welding and which can include a unique configuration for the ultrasonic welding surfaces which prevents the flow of melted thermoplastic materials outwardly onto the decorative outer surfaces of the various fencing parts. Any excess thermoplastic material is designed to pass inwardly toward the longitudinally extending bore defined in the various fencing construction parts. This concept is particularly useful for attaching capping fence members which are injection molded onto structural fence members which are extruded.

19 Claims, 6 Drawing Sheets

THERMOPLASTIC FENCING CONSTRUCTION AND METHOD OF ASSEMBLY THEREOF

BACKGROUND OF THE INVENTION

1. Field of the Invention

The present invention deals with respect to the field of fencing constructions and various methods of assembly thereof particularly adapted for use with thermoplastic fencing materials such as polyvinyl chloride. Normally such fencing parts are secured with respect to one another by the application of a glue to the securement surfaces. This glue tends to dissolve or melt the surface of the thermoplastic material such that it can firmly bond with other thermoplastic material with which it is brought into abutment. The present invention provides a unique construction which allows ultrasonic welding which greatly decreases the assembly time and increases the efficiency of the overall fencing construction method and of the construction of the fencing itself.

2. Description of the Prior Art

Various constructions are used for thermoplastic fencing such as those shown in U.S. Pat. No. 4,301,343 patented Nov. 17, 1981 to J. A. Jonelis and assigned to Western Electric Company, Incorporated on "Methods And Assemblies For Mounting Parts"; and U.S. Pat. No. 4,544,425 patented Oct. 1, 1985 to D. J. Provolo and assigned to Stewart-Warner Corporation on a "Method For Attaching Wheels To Dual Wheel Casters, Including Ultrasonic Welding"; and U.S. Pat. No. 4,569,438 patented Feb. 11, 1986 to R. J. Sheffler and assigned to Revlon, Inc. on a "Container Having Fluid-Tight Seal"; and U.S. Pat. No. 4,618,516 patented Oct. 21, 1986 to T. B. Sager and assigned to Branson Ultrasonics Corporation on an "Ultrasonic Welding Of Thermoplastic Workpieces"; and U.S. Pat. No. 4,631,685 patented Dec. 23, 1986 to D. A. Peter and assigned to General Motors Corporation on a "Method And Apparatus For Ultrasonic Plastic Forming And Joining"; and U.S. Pat. No. 4,769,095 patented Sep. 6, 1988 to T. B. Sager and assigned to Branson Ultrasonics Corporation on a "Method Of Closing An Open Ended Thermoplastic Body"; and U.S. Pat. No. 5,011,555 patented Apr. 30, 1991 to T. B. Sager and assigned to Branson Ultrasonics Corporation on a "Method Of Ultrasonically Cutting And Sealing Thermoplastic Workpieces Particularly A Filter"; and U.S. Pat. No. 5,199,837 patented Apr. 6, 1993 to D. Goss and assigned to Textron Inc. on an "Ultrasonic Insert Stud And Method Of Assembly"; and U.S. Pat. No. 5,238,717 patented Aug. 24, 1993 to M. A. Boylan and assigned to Pall Corporation on "End Caps For Filter Elements"; and U.S. Pat. No. 5,303,900 patented Apr. 19, 1994 to J. E. Zulick, III et al on a "Plastic Security Handrail System And Connectors Therefor"; and U.S. Pat. No. 5,360,499 patented Nov. 1, 1994 to N. M. Savovic et al and assigned to Motorola, Inc. on a "Method For Positioning An Object Relative To A Structural Member"; and U.S. Pat. No. 5,401,342 patented Mar. 28, 1995 to D. E. Vincent et al and assigned to DEKA Products Limited Partnership on a "Process And Energy Director For Ultrasonic Welding And Joint Produced Thereby"; and U.S. Pat. No. 5,411,616 patented May 2, 1995 to V. D. Desai et al and assigned to Motorola, Inc. on a "Method For Ultrasonically Welding Thin-Walled Components"; and U.S. Pat. No. 5,520,775 patented May 28, 1996 to S. R. Fischl et al and assigned to Motorola, Inc. on an "Energy Director For Ultrasonic Weld Joint"; and U.S. Pat. No. 5,540,808 patented Jul. 30, 1996 to D. E. Vincent et al and assigned to DEKA Products Limited Partnership on an "Energy Director For Ultrasonic Welding And Joint Produced Thereby"; and U.S. Pat. No. 5,782,575 patented Jul. 21, 1998 to D. E. Vincent et al and assigned to DEKA Products Limited Partnership on an "Ultrasonically Welded Joint"; and U.S. Pat. No. 5,830,300 patented Nov. 3, 1998 to K. Suzuki et al and assigned to Star Micronics Co., Ltd. on a "Method Of Ultrasonic Welding For A Resin Case"; and U.S. Pat. No. 5,855,706 patented Jan. 5, 1999 to D. A. Grewell and assigned to Branson Ultrasonics Corporation on "Simultaneous Amplitude And Force Profiling During Ultrasonic Welding Of Thermoplastic Workpieces"; and U.S. Pat. No. 5,899,239 patented May 4, 1999 to M, L. Coulis and assigned to Associated Materials, Incorporated on a "Tubular Fencing Components Formed From Plastic Sheet Material"; and U.S. Pat. No. 5,924,584 patented Jul. 20, 1999 to S. P. Hellstrom et al and assigned to Abbott Laboratories on a "Container Closure With A Frangible Seal And A Connector For A Fluid Transfer Device"; and U.S. Pat. No. 6,001,201 patented Dec. 14, 1999 to D. E. Vincent et al and assigned to Deka Products Limited Partnership on a "Process And Energy Director For Welding And Joint Produced Thereby"; and U.S. Pat. No. 6,066,216 patented May 23, 2000 to E. F. Ruppel, Jr. and assigned to Biometric Imaging, Inc. on a "Mesa Forming Weld Depth Limitation Feature For Use With Energy Director In Ultrasonic Welding"; and U.S. Pat. No. 6,068,901 patented May 30, 2000 to J. Medal and assigned to Unimation, Inc. on an "Ultrasonic Energy Directing Attachment Of Plastic Parts To One Another"; and U.S. Pat. No. 6,176,953 patented Jan. 23, 2001 to B. D. Landreth et al and assigned to Motorola, Inc. on an "Ultrasonic Welding Process"; and U.S. Pat. No. 6,220,777 patented Apr. 24, 2001 to J. E. Clarke et al and assigned to Lucent Technologies Inc. on "Methods And Apparatus For Producing Ultrasonic Weld Joints For Injection Molded Plastic Parts"; and U.S. Pat. No. 6,228,508 patented May 8, 2001 to R. Kassanits et al and assigned to Spraying Systems Co. on a "Process For Preparing A Metal Body Having A Hermetic Seal"; and U.S. Pat. No. 6,290,551 patented Sep. 18, 2001 to T. M. Nguyen and assigned to FCI USA, Inc. on an "Electrical Connector Having Ultrasonically Welded Housing Pieces"; and U.S. Pat. No. 6,447,866 patented Sep. 10, 2002 to V. A. Kagan et al and assigned to Honeywell International Inc. on "Frictionally Welded Thermoplastic Articles Having Improved Strength"; and U.S. Pat. No. 6,461,763 patented Oct. 8, 2002 to J. D. Witzigreuter et al and assigned to The Gillette Company on a "Battery Cartridge"; and U.S. Pat. No. 6,461,765 patented Oct. 8, 2002 to J. D. Witzigreuter and assigned to Aer Energy Resources Inc. on a "Metal-Air Cell Housing With Improved Peripheral Seal Design".

SUMMARY OF THE INVENTION

The present invention provides a unique thermoplastic fencing construction which facilitates assembly by ultrasonic welding thereof. The fencing construction includes a basic structural fence member of thermoplastic material. Normally such a structural fence member is extruded from thermoplastic material and will comprise a fence post, a fence rail or a fence picket. Also included is a capping fence member which is normally formed by injection molding of thermoplastic material and is selectively positionable in abutment with respect to the structural fence member to facilitate securement with respect thereto by the ultrasonic welding process. When so positioned the capping fence member will extend over the bore opening normally longitudinally defined in the structural fence member.

In detail the structural fence member will comprise a hollow body member of thermoplastic material such as polyvinyl chloride which defines a bore extending longitudinally therealong. This hollow body member will also define at least one bore opening therein which is in fluid flow communication with respect to the bore itself. An inner wall surface will be included within the hollow body member which defines the bore therewithin. An outer wall surface will be positioned oppositely from the inner wall surface and will face outwardly from the hollow body member. A structural securement zone will be defined extending about the hollow body member and about the bore opening. This structural securement zone will be defined between a structural securement zone outer boundary line and a structural securement zone inner boundary line. The outer boundary line will be defined extending along the structural securement zone adjacent the outer wall surface and the inner boundary line will be defined extending along the structural securement zone and be positioned spatially disposed from the structural securement zone outer boundary line in order to define the structural securement zone itself therebetween.

The capping fence member is preferably formed by injection molding and is selectively positionable in abutment with respect to the structural fence member to facilitate securement with respect thereto by ultrasonic welding for the purpose of extending over the bore opening for capping this opening and effectively closing thereof. The capping fence member also adds a decorative end element to the hollow body member with a longitudinally extending bore therethrough which is formed by extrusion.

The capping fence member includes a capping body member of thermoplastic material. A capping securement zone is defined extending around the capping body member and is positionable adjacent to and in registration with respect to the structural securement zone of the structural fence member for the purpose of facilitating securement of these two surfaces by ultrasonic welding. A capping securement zone outer boundary line is defined extending along the capping securement zone and is registrable with respect to the structural securement zone outer boundary line responsive to positioning of the capping securement zone adjacent to the structural securement zone for facilitating securement together by ultrasonic welding. A capping securement zone inner boundary line is also defined extending along the capping securement zone and positioned spatially disposed distant from the capping securement zone outer boundary to define the capping securement zone itself therebetween. This capping securement zone inner boundary line is preferably registrable with respect to the structural securement zone inner boundary line responsive to positioning of the capping securement zone of the capping fence member adjacent to the structural securement zone of the structural fence member for facilitating securement together by ultrasonic welding.

In order to facilitate ultrasonic welding a plurality of welding ribs which act as energy concentrators will be positioned on the capping fence member within the capping securement zone thereof and extending outwardly therefrom. Preferably these welding ribs will be of thermoplastic material and will be formed during the injection molding process for forming the capping fence member itself. The welding ribs can be oriented at any angular orientation with respect to the capping securement zone outer boundary line. This angular orientation can be parallel, perpendicular or any angle therebetween. The welding ribs are adapted to melt responsive to the application of ultrasonic energy thereto to facilitate securement between the structural securement zone and the capping securement zone to facilitate capping thereof. In a preferred configuration the welding rib is positioned spatially separated from the capping securement zone outer boundary line by at least 0.010 inches in order to discourage the flow of ultrasonic melted thermoplastic material from the ribs thereover and onto the outer wall surface of the structural fence member where such flashing would be visible on the completed fence structure and, as such, is undesirable. Also in a preferred configuration the structural securement zone is angularly oriented with respect to the capping securement zone at an angle of approximately ten degrees and with a distance between the capping securement zone outer boundary line and the structural securement zone outer boundary line being less than the distance between the capping securement zone inner boundary line and the structural securement zone inner boundary line in order to further facilitate and encourage the flow of thermoplastic material inwardly toward the bore of the structural fence member during ultrasonic welding thereof to prevent this excess material or flashing from being visible on the outer surface of the finalized fencing construction.

In the preferred configuration the structural securement zone is angularly oriented with respect to the capping securement zone at an acute angle. This angle can vary widely but is usually chosen to be between five and fifteen degrees or at approximately ten degrees. The configuration of the welding ribs and positioning is important in order to carefully guide the flow of melted thermoplastic material during ultrasonic welding and prevent same from moving onto the exposed outer decorative surface. This unwanted flashing can be somewhat controlled by careful positioning of the welding ribs on the capping securement zone of the capping fence member at a location closer to the capping securement zone inner boundary line than to the capping securement zone outer boundary line. As such, any excess melted thermoplastic material during ultrasonic welding will be encouraged to flow inwardly into the bore of the extruded structural fence member. The configuration of the welding rib can be oriented at any angle with respect to the inner and outer walls of the structural member. In some configurations the orientation will be perpendicular and in others it will be parallel or at any angle therebetween. Generally, if the structural member has a thinner wall thickness then the welding ribs will be oriented perpendicularly with respect to the inner and outer walls thereof. In some configurations the welding rib is mounted on the capping fence member within the capping securement zone immediately adjacent to the capping securement zone inner boundary line to provide a quick and easy path for the flow of excess melted material during ultrasonic welding thereof to flow into the bore of the extruded structural member.

The construction and method for assembly of the construction for fencing of the present invention provides for capping two main means. One is a cap which will abut the end of the extruded structural member and in this manner extend over the bore opening thereof. In an alternative configuration the cap can overlap the outer surface of the structural member to some extent and form the mating securement surfaces beneath the overlapping lip which can be secured to the outer surface of the structural member.

It is an object of the present invention to provide a method of assembly and a thermoplastic fencing construction wherein assembly utilizing ultrasonic welding is significantly facilitated.

It is an object of the present invention to provide a method of assembly and a thermoplastic fencing construction wherein assembly is performed much more quickly.

It is an object of the present invention to provide a method of assembly and a thermoplastic fencing construction wherein many different types of decorative caps can be injection molded for securement to extruded structural fencing members.

It is an object of the present invention to provide a method of assembly and a thermoplastic fencing construction wherein excess material during ultrasonic welding will be urged toward the bore of the structural member.

It is an object of the present invention to provide a method of assembly and a thermoplastic fencing construction wherein visible splash out or flash is minimized.

It is an object of the present invention to provide a method of assembly and a thermoplastic fencing construction wherein speed of assembly of the construction is significantly enhanced.

It is an object of the present invention to provide a method of assembly and a thermoplastic fencing construction wherein the overall construction if fairly simple and easily assembled.

It is an object of the present invention to provide a method of assembly and a thermoplastic fencing construction wherein the structural members can comprise fencing posts, rails, pickets or other structural members.

It is an object of the present invention to provide a method of assembly and a thermoplastic fencing construction wherein the capping members can comprise fencing post caps, fencing rail caps or fencing picket caps or other similar designs or constructions.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

The present invention provides a unique method for assembly of a thermoplastic fencing construction as well as an enhanced construction which facilitates the use of ultrasonic welding for the assembly of capping fence members 30 onto structural fencing members 10. Thermoplastic fences include various different generic construction layouts but utilize basically a plurality of individual fence posts 62. The fence post 62 is one of the structural fence members 10 which are secured to the substrate upon which the fence is placed which is normally the earth at regular locations. These fence posts are connected normally by an upper main cross member 66 and a lower main cross member 68 as shown best in FIG. 10. The fence posts 62 comprise one of the generic categories of structural fence members 10. However, also fence rails 70 will extend between the fence posts 62 between the upper and lower main cross members 66 and 68 and thereabove as well as therebelow. Finally the other structural fence member 10 will normally comprise fence pickets 74 which are attached to the upper and lower main cross members 66 and 68 and extend vertically between the fence posts 62.

Figure 10:
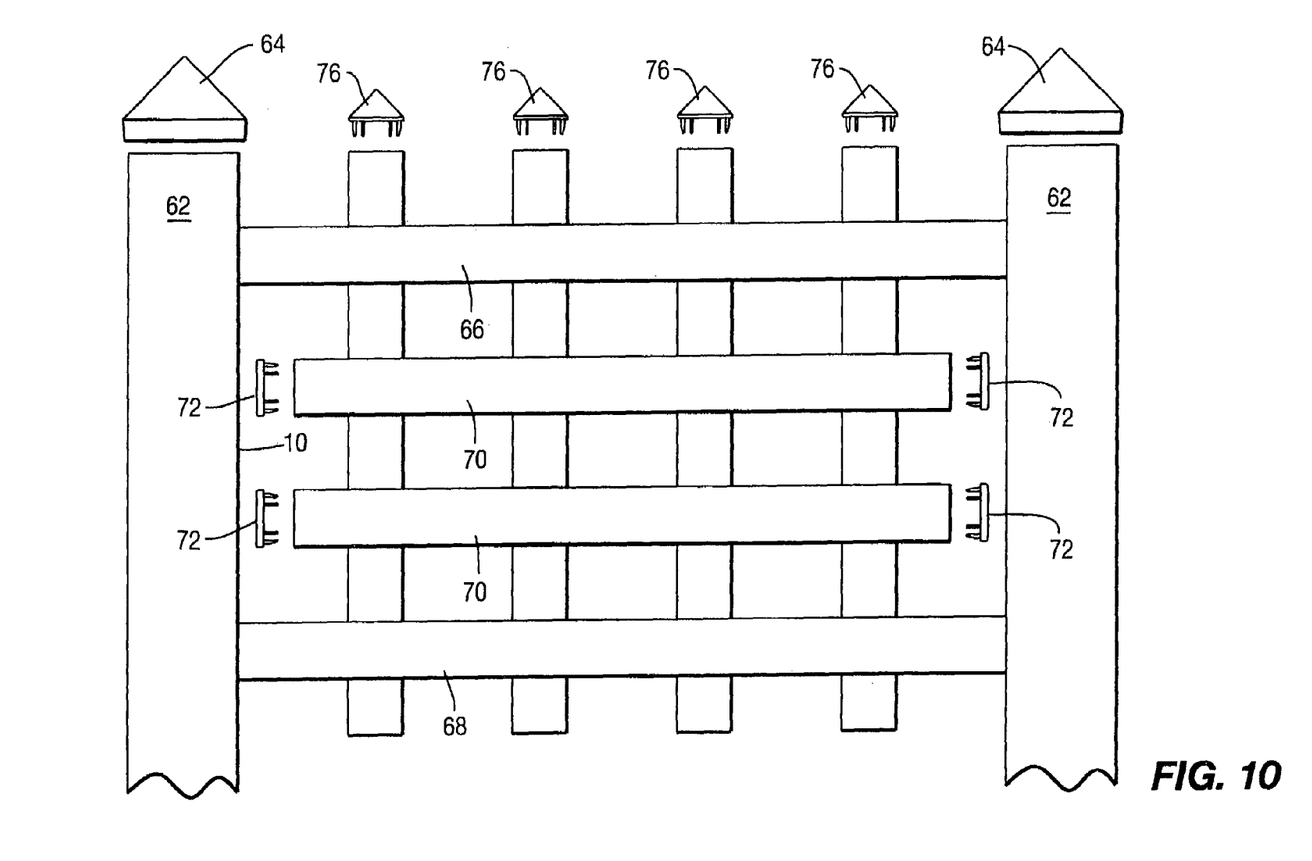
FIG. 10 is a generic fence diagram showing the conventional positioning of the fence posts and fence post caps as well as the upper and lower main cross members and showing the fence rail and fence rail caps and the fencing pickets and fencing picket caps.

The upper main cross member 66 and the lower main cross member 68 normally terminate in a bracket or within the fence post 62 to which they extend. However the fence rails 70 normally terminate short of the fence post 62 and thereby need to be capped. For this purpose fence rail caps 72 are provided for positioning over the open ends of the fence rails 70. Similarly the fence pickets 74 need to have the upper opening normally closed and this is performed by a fence picket cap 76 being positioned across the upwardly facing opening of the individual fence pickets 74. Finally the fence posts 62 which are secured at one end in the ground expose at the opposite end an opening which is normally capped by a fence post cap 64. These caps 64, 72 and 76 are designed to close the open end of the structural fencing member 10 which is usually extruded while at the same time providing a decorative ending of the otherwise linear or longitudinally extending extruded part.

Most of the structural fencing members 10 which include the fence posts as well as the rails and pickets are formed in an extruded process. On the other hand the configuration of the caps 64, 72 and 76 are such a design that they are formed by injection molding. Thus the injected molding caps are formed separately from the extruded structural members and need to be secured thereto in some manner. The present invention provides a unique improvement in the manner of securement or assembly of such a fencing construction by providing an overall design which greatly facilitates the use of ultrasonic welding as a means for capping the various extruded structural fencing members 10.

Each structural fencing member 10 will generically normally include a hollow body member 12 which defines a longitudinally extending bore 14 extending axially therethrough. This bore 14 will define at least one bore opening 16 at one end thereof that needs to be capped. The other end will also define another bore opening. However in certain applications this bore opening is otherwise covered such as being underground or extendable within an adjacent structural member or other similar construction which would avoid the necessity for capping of that end opening. However most of the posts, rails and pickets as described in the present invention all usually require the positioning of a capping fence member 30 upon at one end thereof over the bore opening 16.

These structural fencing members 10 are normally extruded and define an inner wall surface 18 which extends around and defines the longitudinally extending bore 14 therethrough. Similarly and oppositely positioned an outer wall surface 20 is defined by each structural fencing member 10. This outer wall surface 20 is on the opposite outer side of the hollow body member 12 from the inner wall surface 18. The outer wall surface 20 is the surface which is viewed after the fencing construction and, as such, needs to be maintained in a clean and decorative manner.

Each structural fence member 10 will preferably include a structural securement zone 22 to facilitate ultrasonic welding with respect thereto. This ultrasonic securement zone 22 will be defined between a structural securement zone outer boundary line 24 and a structural securement zone inner boundary line 26.

Figure 7:
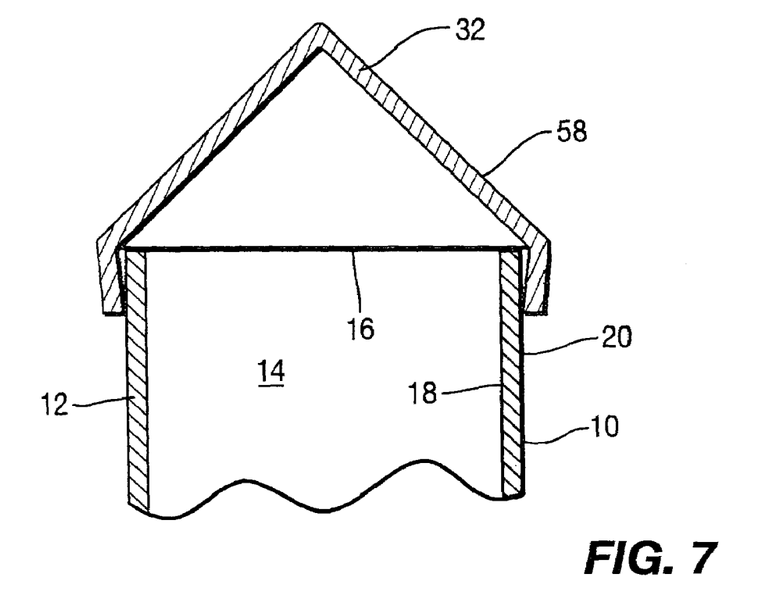
FIG. 7 is an alternative configuration of the present invention showing a capping fence member overlapping the outer wall surface of the structural fence member thereunder.

The capping fence member 30 can comprise various constructions however each of which will include a capping body member 32. The capping fence member 30 can be designed to be positioned in abutment with the end of the extruded structural fence member 10 as shown in the cap end mounted configuration 60 of FIG. 1. Alternatively the capping body member 32 can comprise the cap side mounted or overlapping configuration 58 shown best in FIG. 7. These configurations will alter slightly the positioning of the securement zones on the structural fence member and the capping fence member however the basic theory of assembly and theory of design is similar.

The capping body member 32 of each capping fence member 30 will define a capping securement zone 34. This capping securement zone 34 is designed to be positioned adjacent to the structural securement zone 22 of the structural fence member 10 for facilitating securement of the capping fence member 30 with respect to the structural fencing member 10 particularly by ultrasonic welding thereof. The capping securement zone 34 includes an inner and outer boundary designated as the capping securement zone outer boundary line 36 and the capping securement zone inner boundary line 38. Boundary lines 36 and 38 provide the inner and outer limits of the capping securement zone 34.

A plurality of welding ribs 40 are preferably defined and positioned within the capping securement zone 34. These welding ribs 40 are preferably of thermoplastic material and provide the energy concentrators such that melting of these ribs is facilitated during ultrasonic welding for achieving firm securement between the capping securement zone 34 and the structural securement zone 22.

The energy concentrators or welding ribs 40 will melt when ultrasonic energy is applied to the fencing construction of the present invention. This melted thermoplastic material will provide the means of securement between the securement zone of the structural fence member and the securement zone of the capping fence member. However often excess material is melted more than is needed for the purpose of securing these two surfaces with respect to one another. The present invention provides a unique construction which facilitates the guiding of this excess material as desired. This material often will squirt outwardly through openings or inwardly through openings in various directions to form flashing or other waste material. It is undesirable for this material to extend outwardly past the structural securement zone outer boundary line 24 past the capping securement zone outer boundary line 36 because this unsightly material would then be visible in the finalized fence construction. As such the present invention includes several construction details which would include various constructions to encourage this excess melted material to flow inwardly toward the bore 14 defined in the structural fence member 10.

Figure 3:
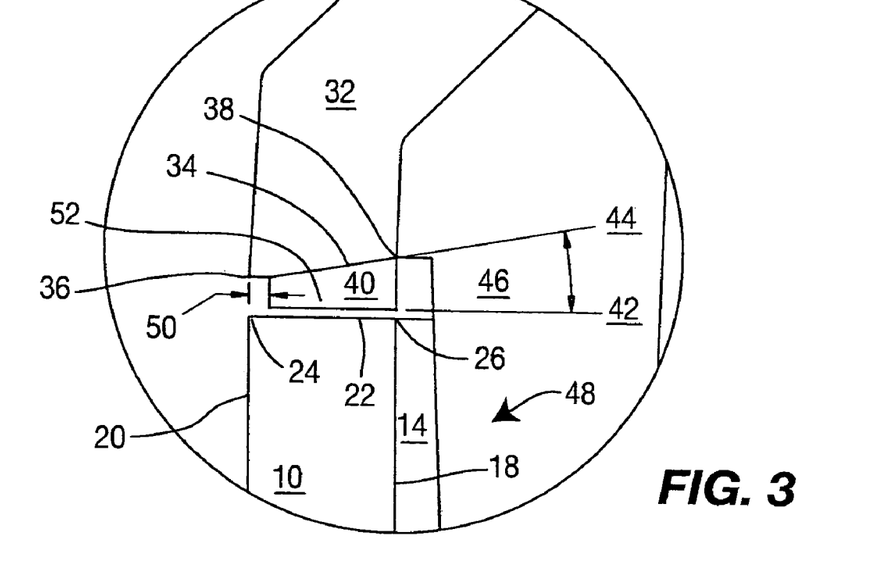
FIG. 3 is an exploded view of the capping fence member of the present invention shown in abutment with respect to structural fencing member of the present invention immediately prior to ultrasonic welding thereof.
Figure 4:
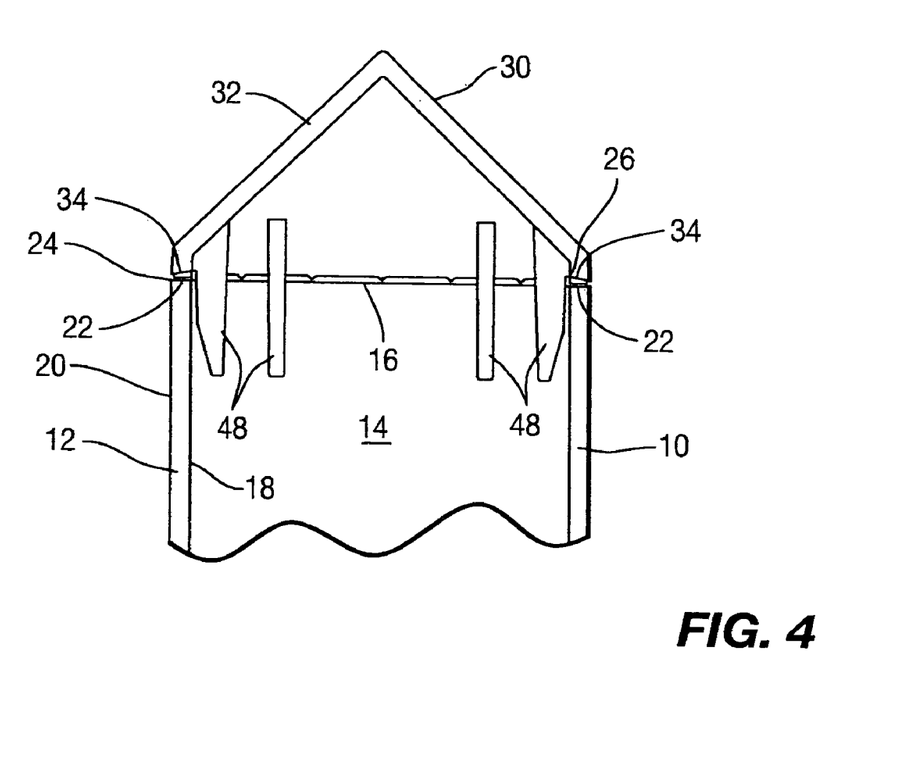
FIG. 4 is a final assembled view of the embodiment shown in FIG. 3.

In one configuration of the structural securement zone 22 and the capping securement zone 34 they are oriented angularly with respect to one another. That is, the plane 42 of the structural securement zone 22 is oriented at an angle with respect to the plane 44 of the capping securement zone 34. The angle 46 between these two planes is any acute angle but is usually chosen to be between five and fifteen degrees. This angle is formed such that it is widening as it extends inwardly. That is, the angle is formed in such a manner that the end is formed such as shown in FIG. 3 wherein the distance between the capping securement zone outer boundary line 36 and the structural securement zone outer boundary line 24 is less than the distance between the capping securement zone inner boundary line 38 and the structural securement zone inner boundary line 26. This orientation is best shown in FIG. 3. The angle 46 of ten degrees between the planes of these two securement zones 34 and 22 is chosen such that as the material of the perpendicularly oriented welding rib 52 melts the capping fence member 30 will move toward the structural fence member 10 and the first point of abutment therebetween will be at the point of intersection between the structural securement zone outer boundary line 24 and the capping securement zone outer boundary line 36. This will seal the external surface and prevent the movement of any melting thermoplastic material therepast that might form flashing visible from the exterior of the fencing construction. Instead any excess thermoplastic material will be caused to urge inwardly toward the bore 14 because the spacing between the capping securement zone inner boundary line 38 and the structural securement zone inner boundary line 26 will be maintained even after ultrasonic welding has been completed because they are spaced apart farther than the spacing between the boundary lines 24 and 36. This angular relationship is an important advantage to this alternative construction of the present invention in order to control the movement of thermoplastic waste material resulting from the ultrasonic welding process.

Figure 2:
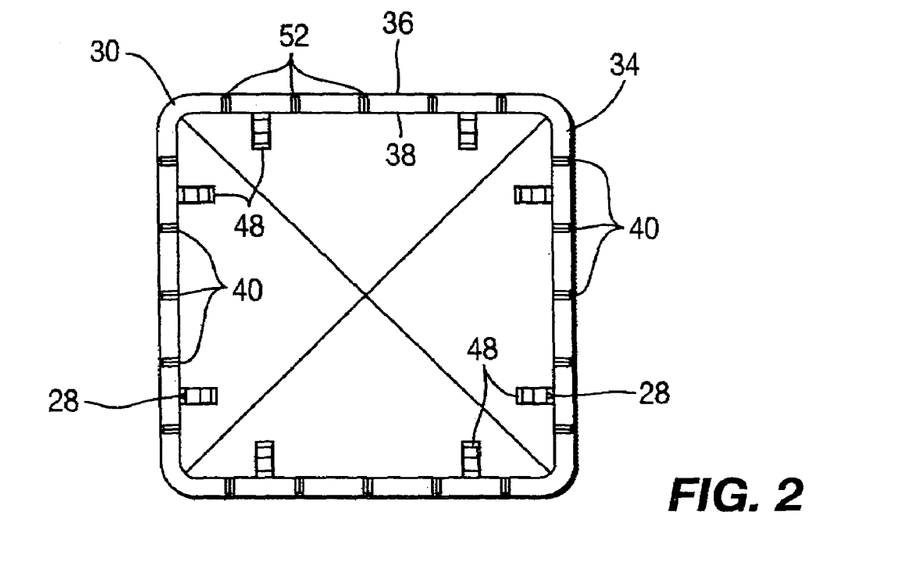
FIG. 2 is a bottom plan view of an embodiment of a capping fence member made in accordance with the present invention.
Figure 5:
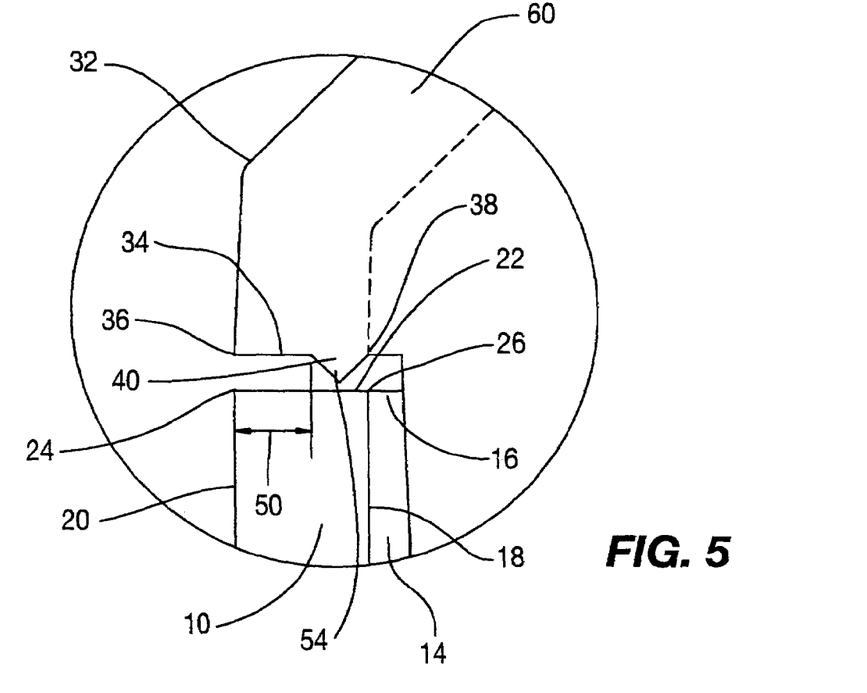
FIG. 5 is an exploded view of an alternative configuration of the present invention showing the mating surfaces to be welded with respect to one another with a welding rib depicted extending parallel with respect to the inner and outer walls of the structural member and positioned adjacent to the structural securement zone inner boundary line to minimize flashing.
Figure 6:
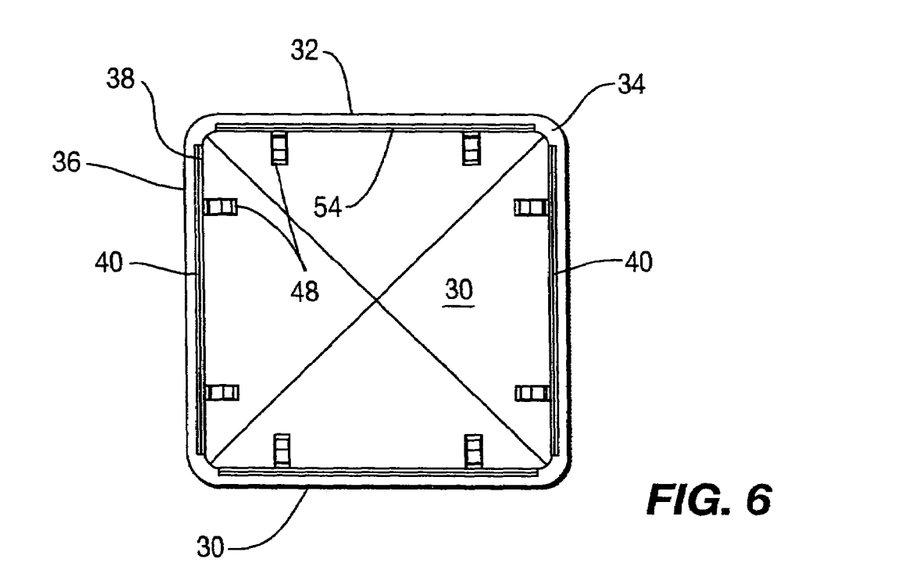
FIG. 6 is a bottom plan view of a capping fence member utilizing the welding rib design of shown in FIG. 5.

It should be appreciated that another advantage of the construction of the present invention is shown in FIG. 5 where the welding rib 40 is shown extending in the parallel direction 54 with respect to the inner and outer wall surfaces 18 and 20 of the structural fence member 10. Also in this configuration shown in FIG. 5 the rib is shown in position 56 which is immediately adjacent to the capping securement zone inner boundary line 38 which also has the primary purpose of urging any waste material to travel into the bore 14. It should be appreciated that the construction of the welding ribs 40 of the present invention can assume the parallel orientation 54 shown in FIG. 6 or can assume the perpendicular orientation 52 as shown in FIG. 2. Both of those are operable while maintaining the important advantages and improvements of the present invention.

The spatial positioning of the welding rib 40 is an important consideration. Normally this rib is formed in the capping securement zone 34 during the injection molding process which forms the capping fence member 30. In most configurations the capping fence member 30 will be formed as a single integral member of thermoplastic material by injection molding which will result in the welding rib 40 being formed integrally with the capping fence member 30 and simultaneously therewith out of thermoplastic material. Ultrasonic welding normally causes smaller defined portions of thermoplastic material to melt more quickly and these are the energy concentrators or welding ribs 40 of the present invention.

Positioning of the welding ribs 40 is an important characteristic. A rib set back space 50 is preferably defined which provides some spatial set back of the welding rib 40 from the capping securement zone outer boundary line 36. This is also clearly for the purpose of minimizing any flow of thermoplastic material outwardly past the outer boundary lines 24 and 36 and onto the outer wall surface 20 of the structural fence member 10 or onto the outer wall surface of the capping fencing member 30. Such flashing would then be visible and would need to be removed resulting in additional labor and time and effort as well as providing a less well refined overall fencing construction design. An important rib set back configuration is also shown in FIG. 3. Here the rib set back 50 which is at least 0.010 inches and preferably is in the range of 0.010 to 0.050 inches further minimizes flashing exiting the mating area of the securement zone 22 and 34 during ultrasonic welding of the caps to the structural members. Preferably, the set back distance is chosen to be greater than between 50% to 100% of the vertical height of the welding rib. For polyvinyl chloride thermoplastic material this set back is usually 0.010 to 0.050 inches. This is because the welding rib 40 is positioned immediately adjacent to the capping securement zone inner boundary line 38 while being positioned spatially distant from and set back from the capping securement zone outer boundary line 36. Thus movement of the excess melted material during ultrasonic welding toward the bore 14 will be enhanced.

Figure 8:
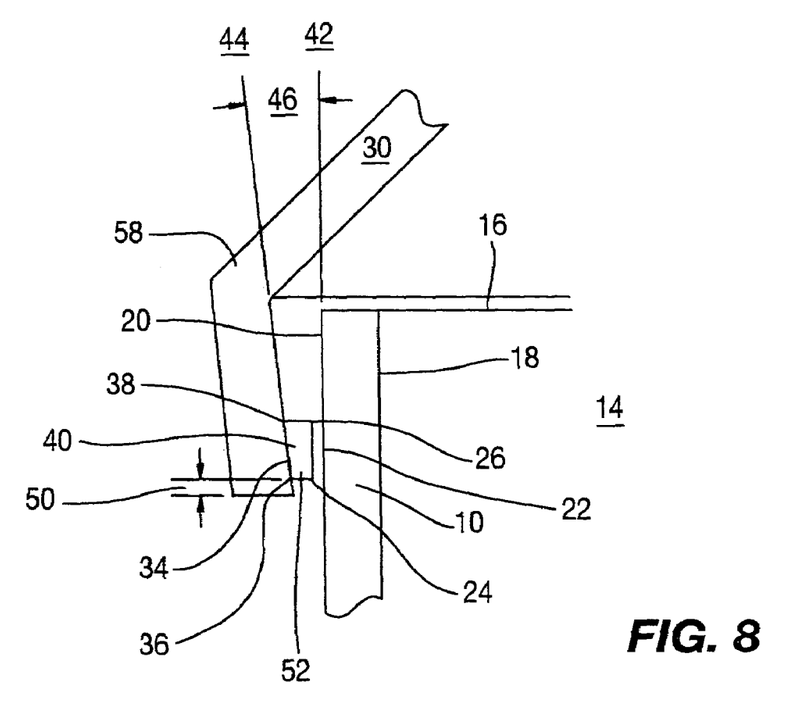
FIG. 8 is a closeup of the intersection between the structural securement zone of the structural fence member and the capping securement zone of the capping fence member of the FIG. 7 configuration.
Figure 9A:
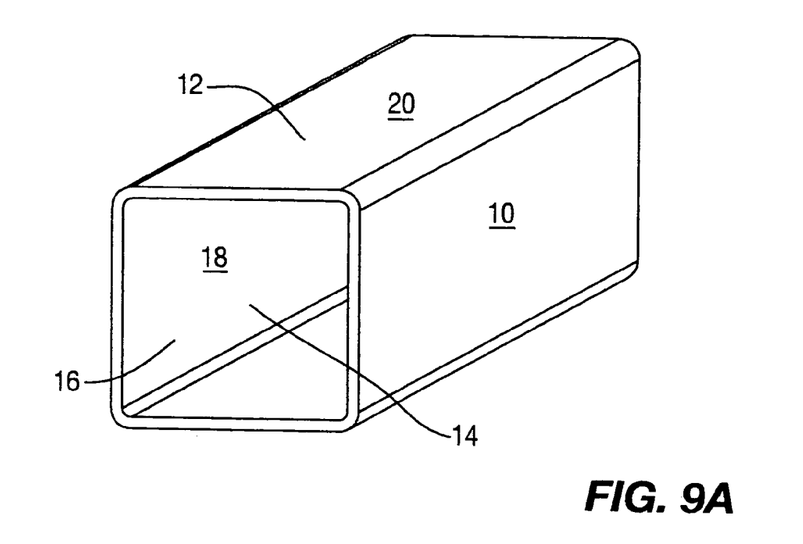
FIG. 9A is a perspective illustration of an embodiment of a generic structural fence member made in accordance with the present invention.
Figure 9B:
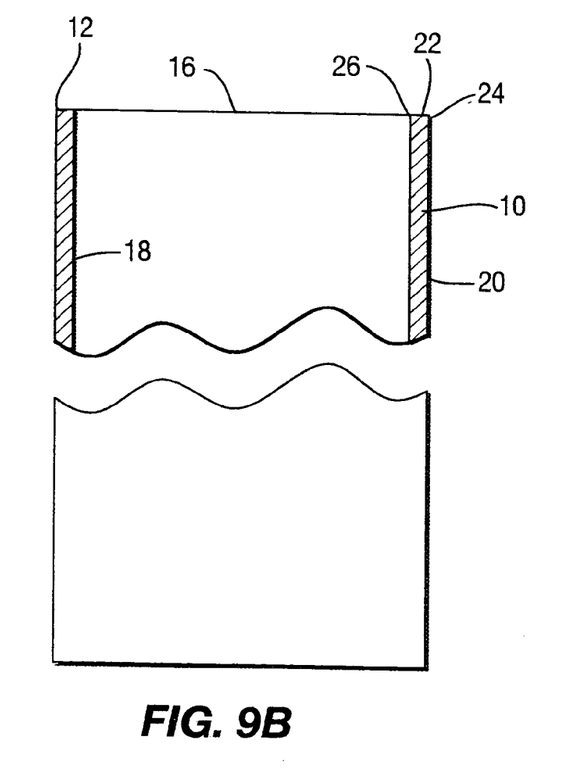
FIG. 9B is a cross-sectional view of the structural fence member shown in FIG. 9A.

This is also an important consideration in the overlapping or external cap side mounted configuration 58 shown in FIG. 8. Here again we see the rib set back space 50 between the welding rib 40 and the capping securement zone outer boundary line 36. On the other hand the welding rib 40 extends all the way to the capping securement inner boundary line 38. In this configuration since it is overlapping configuration the capping securement zone inner boundary line 38 is not immediately adjacent to the bore 14 of structural fence member 10. However, the set back of the welding rib 40 and the angular relationship between the plane 42 of the structural securement zone 22 and the plane 44 of the capping securement zone 34 will significantly encourage the movement of any excess melted material upwardly in a direction toward the bore 14 and will minimize the flow of such material downwardly where it could be used immediately below the lowermost edge of the overlapping cap member of the finalized fencing construction.

To further facilitate alignment between the capping fence member 30 and the structural fence member 10 during ultrasonic welding therebetween a plurality of alignment pins 48 are preferably oriented extending outwardly from the capping fence member 10. These pins are adapted to extend through the bore opening 16 into the bore 14 of the structural fence member 10 to maintain the position of the capping fence member 30 with respect thereto during the securement therebetween by ultrasonic welding.

An important characteristic of the present invention is in the configuration of the welding ribs 40 otherwise known as sonic energy directors. The present invention has been found useful wherein these ribs are oriented parallel to the walls of the structural fence member 10 or whether they extend perpendicular thereto. Preferably the welding ribs are positioned closer to the inner portion of the structural fence member 10 for the purpose of minimizing the movement of flashing outwardly therefrom. It is also important to appreciate that the present invention is useful with capping fence members and structural fence members of various different wall thicknesses. Furthermore the wall thickness of the capping member and wall thickness of the structural member need not be the same as one another. These can vary significantly. Another important consideration of the present invention is that the formation of the hermetic seal between the capping member and the structural fence member is not required. Often a hermetic seal is achieved and such seals do have more aesthetic appeal however they are not an absolute requirement with the process of the construction of the present invention.

Figure 1:
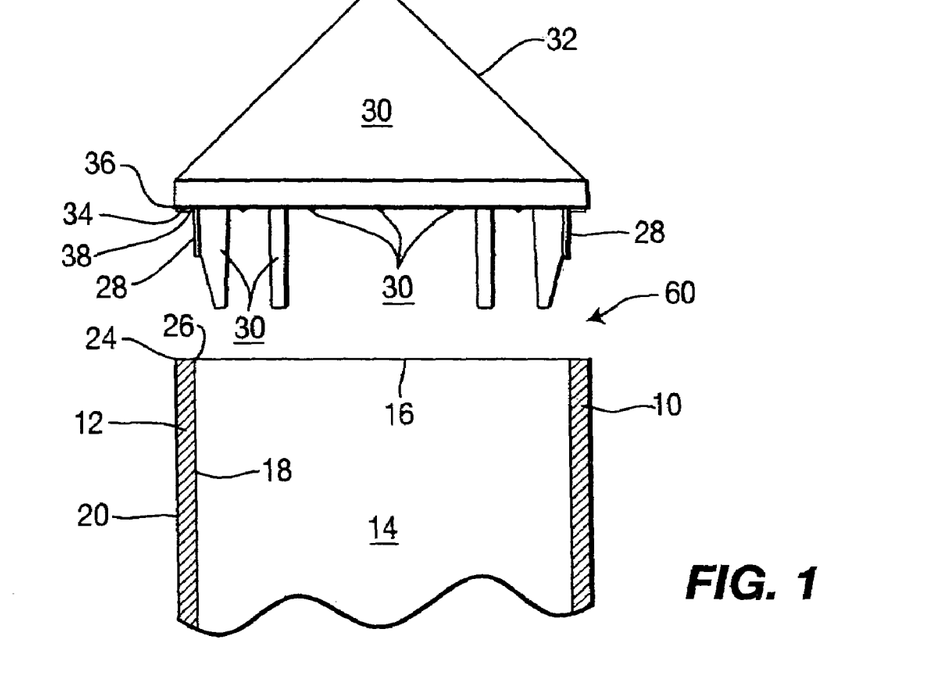
FIG. 1 is a front plan view of an embodiment of the thermoplastic fencing construction of the present invention being assembled.
Figure 11:
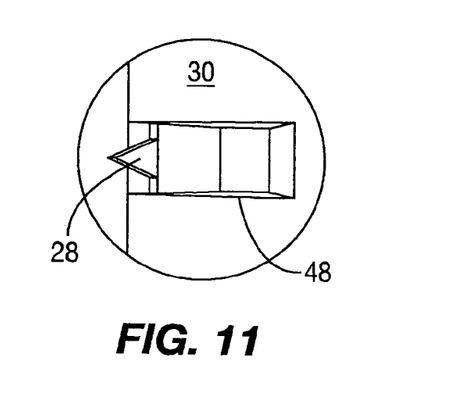
FIG. 11 is a bottom plan view of an embodiment of the capping member of the present invention illustrating the alignment pin configured with a crush rib extending outwardly therefrom.

In a further alternative embodiment of the present invention, each of said alignment pins 48 will sometimes optionally includes a crush rib 28 positioned on the outer surface thereof as shown best in FIGS. 11, 1 and 2. These crush ribs 28 are preferably of a thermoplastic material to facilitate deformation thereof. Crush ribs 28 are designed to abut the inner wall surface 18 of the structural fence member 10 in order to initially facilitate alignment therebetween. These crush ribs 28 are further designed to be deformable as the capping fence member 30 is attached with respect to the structural fence member to further facilitate engagement therebetween.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A method for assembly of a thermoplastic fencing construction comprising:
   A. providing a structural fence member of thermoplastic material with a bore extending longitudinally therethrough and defining a structural securement zone adapted to be securable with respect thereto;
   B. providing a capping fence member of thermoplastic material with a plurality of welding ribs extending outwardly therefrom to facilitate ultrasonic welding thereof and defining a capping securement zone for placement adjacent to the structural securement zone for mutual securement by ultrasonic welding together;
   C. positioning of the capping fence member extending over the bore defined in the structural fence member with the welding ribs in abutment with the structural member and with the capping securement zone in registration with respect to the structural securement zone; and D. securing of the capping fence member to the structural fence member by ultrasonically melting of the welding ribs positioned therebetween to affix the capping securement zone with respect to the structural securement zone.

2. A method for assembly of a thermoplastic fencing construction as defined in claim 1 wherein said providing a structural fence member includes extruding of a structural fence member from thermoplastic material.

3. A method for assembly of a thermoplastic fencing construction as defined in claim 2 wherein the thermoplastic material is polyvinyl chloride.

4. A method for assembly of a thermoplastic fencing construction as defined in claim 1 wherein said providing a capping fence member includes injection molding of a capping fence member from thermoplastic material.

5. A method for assembly of a thermoplastic fencing construction as defined in claim 4 wherein the thermoplastic material is polyvinyl chloride.

6. A method for assembly of a thermoplastic fencing construction as defined in claim 1 wherein said providing of a capping fence member includes defining of a plurality of welding ribs thereon formed of thermoplastic material.

7. A method for assembly of a thermoplastic fencing construction as defined in claim 6 wherein the thermoplastic material is polyvinyl chloride.

8. A method for assembly of a thermoplastic fencing construction as defined in claim 1 wherein said positioning of the capping fence member is performed with the capping securement zone defined thereon oriented angularly with respect to a structural securement zone defined on the structural fence member to urge thermoplastic material during ultrasonic welding to flow toward the bore defined in the structural fence member.

9. A method for assembly ofa thermoplastic fencing construction as defined in claim 8 wherein said positioning of the capping fence member is performed with the plane of the capping securement zone oriented at an acute angle with respect to the plane of the structural securement zone.

10. A method for assembly of a thermoplastic fencing construction as defined in claim 8 wherein said positioning of the capping fence member is performed with the capping welding zone oriented at an angle of approximately five to fifteen degrees with respect to the structural welding zone.

11. A method for assembly of a thermoplastic fencing construction as defined in claim 1 wherein the outermost boundary lines of the capping securement zone on the capping fence member and the structural securement zone on the structural fence member are urged into abutment with respect to one another during ultrasonic welding of the capping fence member to the structural fence member into order to urge excess thermoplastic material, to flow toward the bore defined in the structural fence member.

12. A method for assembly of a thermoplastic fencing construction as definedin claim 11 wherein the innermost, boundary lines, of the capping securement zone on the capping fence member and the structural securement zone on the structural fence member are maintained spaced apart from one another at all times during ultrasonic welding thereof together as the capping fence member is secured to the structural fence member into order to urge excess thermoplastic material to flow toward the bore defined in the structural fence member.

13. A method for assembl of a thermoplastic fencing construction as defined in claim 1 wherein said capping fence member is provided with alignment pins means extending outwardly therefrom to facilitate aligning of the capping fence member with the structural fence member during securing thereof together by ultrasonic welding.

14. A method for assembly of a thermoplastic fencing construction as defined in claim 1 wherein the capping fence member is provided with the welding ribs positioned spatially distant from the outer surface thereof to minimize flow of thermoplastic material onto theexposed portion of the outer surface of thecapping fence member and the structural fence member during ultrasonic, welding thereof.

15. A method for assembly ofa thermoplastic. fencing construction as defined in claim 14 wherein the capping fence member, is provided with welding ribs positioned greater than 0.0.10 inches from the outermost boundary line of the capping secnrement zone of the capping fence member.

16. A method for assembly of a thermoplastic fencing construction as defined in claim 1 wherein said providing of the capping fence member is performed with the welding ribs oriented approximately perpendicularly with respect to the outer wall thereof.

17. A method for assembly of a thermoplastic fencing construction as defined in claim 1 wherein the capping fence member is secured by ultrasonic welding thereof to an edge of the structural fence member defined between the inner wall surface and the outer wall surface.

18. A method for assembly of a thermoplastic fencing construction as defined in claim 1 wherein the capping fence member is secured by ultrasonic welding thereof to the outer wall surface of the structural fence member.

19. A method for assembly of a thermoplastic fencing construction as defined in claim 18 wherein the capping fence member is secured by ultrasonic welding thereof extending across at least a portion of the outer wall surface of the structural fence member.

* * * * *

UNITED STATES PATENT AND TRADEMARK OFFICE
CERTIFICATE OF CORRECTION

| | | |
|---|---|---|
| PATENT NO. | : 7,204,898 B2 | Page 1 of 1 |
| APPLICATION NO. | : 10/898052 | |
| DATED | : April 17, 2007 | |
| INVENTOR(S) | : James Fattori | |

It is certified that error appears in the above-identified patent and that said Letters Patent is hereby corrected as shown below:

In column 12, line 30, change "0.0.10" to -- 0.010 --.

Signed and Sealed this

Nineteenth Day of June, 2007

JON W. DUDAS
*Director of the United States Patent and Trademark Office*